(12) United States Patent
Lawange

(10) Patent No.: US 8,867,682 B2
(45) Date of Patent: Oct. 21, 2014

(54) DEJITTER (DESYNCHRONIZE) TECHNIQUE TO SMOOTH GAPPED CLOCK WITH JITTER/WANDER ATTENUATION USING ALL DIGITAL LOGIC

(75) Inventor: Omeshwar Suryakant Lawange, Milpitas, CA (US)

(73) Assignee: Exar Corporation, Fremont, CA (US)

( * ) Notice: Subject to any disclaimer, the term of this patent is extended or adjusted under 35 U.S.C. 154(b) by 295 days.

(21) Appl. No.: 12/871,105

(22) Filed: Aug. 30, 2010

(65) Prior Publication Data

US 2012/0051477 A1    Mar. 1, 2012

(51) Int. Cl.
*H04L 25/00*     (2006.01)
*H04J 3/07*     (2006.01)

(52) U.S. Cl.
CPC ..................... *H04J 3/076* (2013.01)
USPC ........................................................ 375/371

(58) Field of Classification Search
CPC ......... H04L 7/033; H04L 7/0337; H04J 3/07; H04J 3/0682; H04J 3/0685; H03K 5/1565; G06F 1/10
USPC ................. 375/354, 363, 371, 372, 376, 356; 370/235; 331/1 A; 708/271; 327/113
See application file for complete search history.

(56) References Cited

U.S. PATENT DOCUMENTS

| | | | | |
|---|---|---|---|---|
| 5,119,406 A * | 6/1992 | Kramer | | 375/372 |
| 5,471,511 A * | 11/1995 | De Langhe et al. | | 375/376 |
| 5,790,614 A * | 8/1998 | Powell | | 375/376 |
| 6,501,307 B1 * | 12/2002 | Yen | | 327/113 |
| 6,501,809 B1 * | 12/2002 | Monk et al. | | 375/363 |
| 7,844,650 B2 * | 11/2010 | Warner et al. | | 708/271 |
| 7,986,190 B1 * | 7/2011 | Lye | | 331/1 A |
| 8,090,066 B2 * | 1/2012 | Ji et al. | | 375/372 |
| 8,406,361 B2 * | 3/2013 | Den Besten et al. | | 375/356 |
| 2004/0201939 A1 | 10/2004 | Shipton et al. | | |
| 2007/0041324 A1 * | 2/2007 | Shenoi | | 370/235 |
| 2010/0039157 A1 | 2/2010 | Kaeriyama et al. | | |
| 2010/0091921 A1 * | 4/2010 | Den Besten et al. | | 375/354 |

OTHER PUBLICATIONS

International Searching Authority, International Search Report and Written Opinion for PCT/US2011/046962, Dec. 16, 2011, 8 pages.

* cited by examiner

*Primary Examiner* — Daniel Washburn
*Assistant Examiner* — Fitwi Hailegiorgis
(74) *Attorney, Agent, or Firm* — Kilpatrick Townsend & Stockton LLP

(57) ABSTRACT

Digital logic receives a gapped and jittery clock signal with specified frequency and frequency offset allowed by specification and a reference clock signal with same specified frequency and different frequency offset allowed by specification having low jitter. The digital logic adds and/or removes cycles from the reference clock signal over an extended period of time to produce a produced clock signal with low jitter that has a frequency that approaches the frequency of the gapped and jittery clock signal. The produced clock signal being provided as feedback to the digital frequency comparator and also acts as final dejitter smooth clock output with 50% duty cycle.

20 Claims, 17 Drawing Sheets

DEJITTER (DESYNCHRONIZE) TECHNIQUE TO SMOOTH GAPPED CLOCK WITH JITTER/WANDER ATTENUATION USING ALL DIGITAL LOGIC

BACKGROUND

In telecom circuits it is very common to map low speed tributaries into a high speed signal such that high bandwidth traffic can be routed from one node to another node using sonet/SDH framed data on optical fiber. Add/drop multiplexers are deployed on the network interface cards to support such mapping and demapping functions. There are several challenges in this process:
1. In an asynchronous mapping procedure, the reference clocks for high speed sonet/SDH and low speed tributaries are not derived from same reference.
2. There is always a difference in frequency of clocks that are used to map the low speed tributaries and the high speed signal. These differences are referred to as a PPM (parts per million) difference in the reference clocks of these signals. For example DS1/E1 clocks can have frequency between +/−32 PPM and sonet/SDH signal can have frequencies between +/−20 PPM. This results in stuffing and destuffing bits within low speed tributaries if they are mapped or demapped asynchronously. This also introduces payload pointer and the payload pointer's movement with respect to line overhead bytes or virtual tributary path overhead bytes.
3. The noise in the network and different clock sources introduces low frequency wander which ranges below 10 Hz. This wander is not exactly periodic in single frequency but varies between 0 to 10 Hz.
4. This ultimately creates gapped and jittery demapped clock at the output of demapper circuit which demaps low speed tributary such as DS1/E1 signal from high speed sonet/SDH signal such as STS-1/STM-0.

Prior systems have used analog elements to deal with the gapped and jittery demapped clock at the output of the demapper circuit. These systems can be expensive and dependent on the semiconductor processes used to produce the analog elements.

SUMMARY OF THE INVENTION

Digital logic is used to convert a gapped and jittery clock into a smoothed clock with low jitter that matches the frequency of the gapped and jittery clock. The use of digital logic allows for an inexpensive and reusable design which can also be re-mapped in FPGA or ASICs using different semiconductor process.

The digital logic includes a gapped clock smoother circuit to smooth the gapped and jittery external clock. A frequency comparator connected to the gapped clock smoother circuit determines the frequency difference between the smoothed but jittery clock (whose frequency matches the gapped but still jittery clock) and a reference clock with low jitter. The reference clock can be derived by dividing a local oscillator clock by n. "n" is chosen in such a way that the jitter on output clock is equal to 2π/n. In this case "n" is chosen to be equal to 32. The reference clock ideally has same base frequency as that of incoming gapped clock but with different frequency offset. In this case the offset could be +/−255 Hz. A digital filter is used to filter the frequency difference from the frequency comparator. Time delay logic connected to the digital filter is used to time phase corrections. A phase correction unit, such as a down counter with selectable divide-by-factors, is used to make these phase corrections and thus produce the smoothed clock with low jitter that matches the frequency of the gapped and jittery clock. Making relatively small phase corrections that are spaced apart allows for pulses to be added or removed so that the produced clock has low jitter (as permitted by given specification) and also matches the frequency of the gapped and jittery clock.

DESCRIPTION

Digital logic 100 receives a jittery clock signal, on line 102. The jittery clock signal may be a jittery clock signal from a demapper. The jittery clock signal can have a frequency that deviates from a desired frequency by a certain amount. In one embodiment, the jittery clock signal can be as much as +/−32 PPM off of a specification frequency along with additional frequency offset caused by pointer justification.

The jittery clock signal can be a gapped and jittery clock signal that is received by gapped clock smoother circuit 118. The gapped clock smoother circuit 118 can produce a smoothed (degapped) but jittery clock signal, on line 105, that is not gapped but matches the frequency of the gapped and jittery clock signal.

Figure 1:
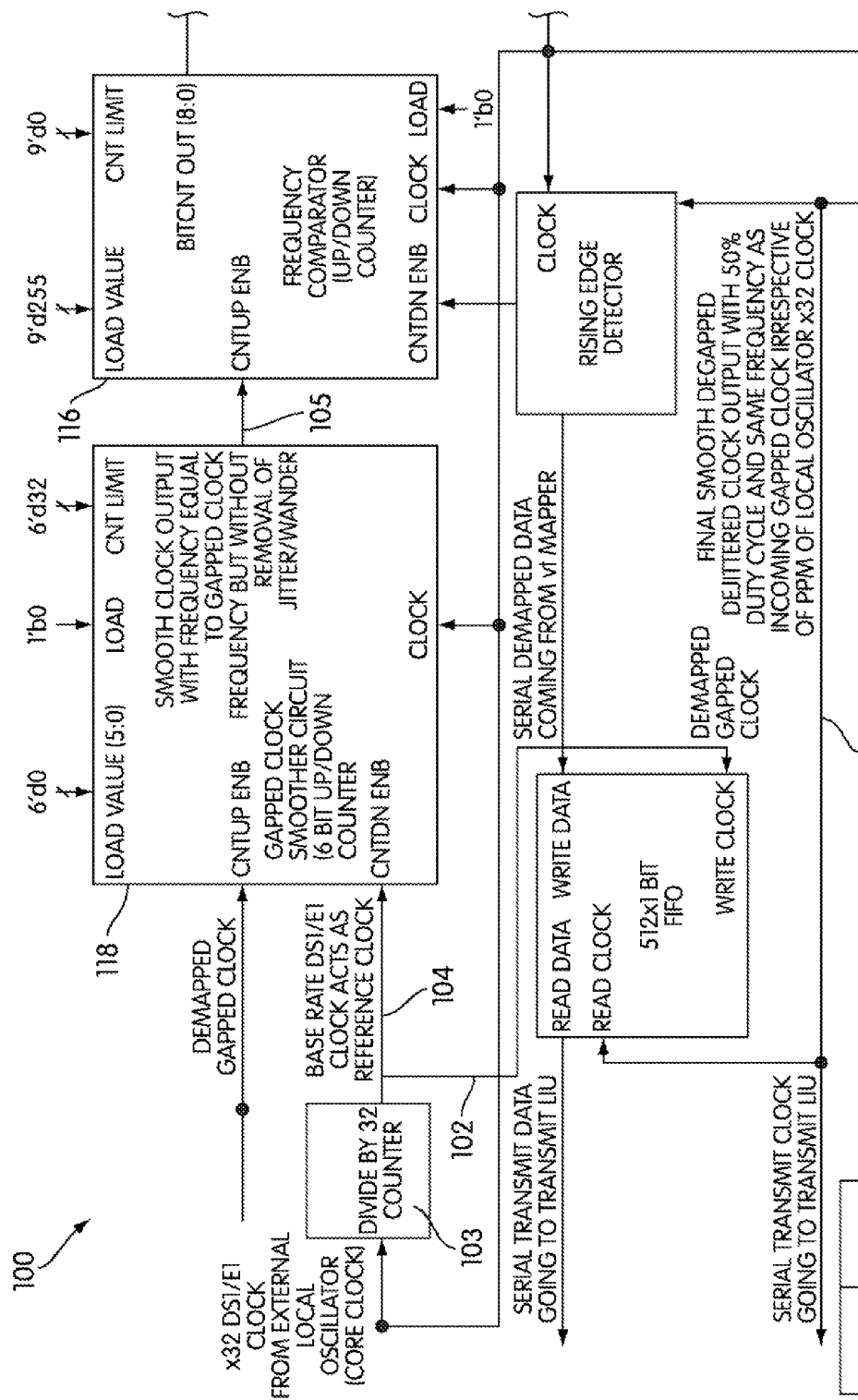
FIG. 1 shows an overall system block diagram illustrating a dejitter circuit to reduce demapping jitter and smooth the incoming gapped clock.

A reference clock signal with low jitter is received on line 104. The reference clock signal can be obtained or derived from an external local oscillator. This reference clock signal with low jitter can have a frequency that is close to the specification frequency. In the example of FIG. 1, an external local oscillator creates a core clock signal at 32× the specification frequency and divide-by-32 logic 103 is used to create the reference clock signal. Still there is frequency offset between incoming gapped clock and this reference clock which can vary between +/−255 Hz at any given time.

The digital logic adds and/or removes cycles from the reference clock signal over an extended period of time to produce a produced clock signal, on line 106, with low jitter that has a frequency that approaches the frequency of the gapped clock signal and has 50% duty cycle. The produced clock signal is provided as feedback to the digital frequency comparator via rising edge detector to match its high time to one pulse of the core 32× clock.

A maximum time interval error of the produced clock signal can be less than a specified limit, such as less than 700 ns (for DS1). The produced clock signal can meet the requirements of a specification, such as DS1 or E1 demapped from a VT demapper.

The digital logic 100 is synchronous logic which means that it can be used in a variety of different designs without requiring modifications. The synchronous logic can be clocked by the core clock signal from the external local oscillator which has a frequency that is ×32 times the specification frequency.

The digital logic 100 is adapted to provide multiple phase corrections to the reference clock signal so as to add and/or remove the cycles over the extended period of time and produce the produced clock signal.

The digital logic 100 includes a digital frequency comparator 116 to compare the frequency of the smoothed clock on line 105 (that has the same frequency as the jittery clock signal on line 102) and the produced clock signal used as feedback. The frequency comparator 116 can be implemented as an up/down counter. The count can be incremented on pulses of the smoothed clock and decremented on pulses from, or derived from the produced clock signal.

A digital low pass filter 120 receives the output from the digital frequency comparator 116. The digital low pass filter 120 can be a 2 tap average/sum filter, as described below. The output of the digital low pass filter 120 is provided to time delay logic 108 to produce timing signals to time phase corrections.

The phase corrections can be equal to $2\pi/n$, where n is an integer. Exemplary phase corrections can be equal to $2\pi/2^y$, where y is an integer that is greater or equal to 2, such as a phase correction of $2\pi/32$ (n is equal to $2^y$). As described below, a phase correction of $2\pi/32$ can be implemented using a logic clocked by a core clock that is 32× the desired specification frequency.

Frequency difference times n phase corrections can be done within the extended period of time so as to add or remove a number of cycles equal to the frequency difference from the reference clock signal to produce the produced clock signal.

The phase corrections need not be done on consecutive cycles. The digital logic 100 includes time delay logic 108 to time the phase corrections. The time delay logic 108 can include a multiplexer 110 and a down counter 112. Multiplexer 110 selects a time delay value based on the weighted frequency difference from the digital filter 120. Counter 112 converts the selected time delay value into a time delay signal on line 124.

In one embodiment, the multiplexor and down counter 112 can also implement a second order of filtering in combination with the digital filter 120.

In one embodiment, the weighted frequency difference output from the digital filter 120 is updated at 8 kHz. Once the down counter 112 sends the timing signal on line 124, the down counter 112 reloads the time delay value from multiplexer 110

A phase correction unit 114 can implement the phase corrections. In one embodiment, a down counter 114 with different selectable divide by factors can produce cycles that are normal or have a phase correction. In one embodiment, the phase correction is $+/-2\pi/32$.

In exemplary embodiment, when both the add_pulse and mask_pulse bits are "0", the down counter 114 decrements from the loaded value of 31. The $4^{th}$ bit position is high for the 16 values "31-16" and low for the 16 values from "15-0" producing a cycle with no phase correction. When the "mask_pulse" is "1" and the "add_pulse" is "0", the down counter 114 decrements from 32. The $4^{th}$ bit position will be high for the 17 values from "32-16" and low for the 16 values from "15-0" producing a pulse with a $+2\pi/32$ phase correction. When the mask_pulse is "0" and the add_pulse is "1", the down counter 114 decrements from 30. The $4^{th}$ bit position will be high for the 15 values from "30-16" and low for the 16 values from "15-0" producing a pulse with a $-2\pi/32$ phase correction.

Add_bit and Mask_bit logic 122 can be used to produce values for the down counter 114 with divide by factor when the timing signal on line 124 indicates a correction is to be done. Comparator 126 determines whether a weighted frequency difference is positive (above 255) or negative (below 255).

The dejitter circuit 100 is designed to be used in a mapping and demapping application to smooth the gaps from demapped clock, make it have a 50% duty cycle and attenuate its phase jitter/wander to satisfy Bellcore GR-253-CORE specifications. Although this circuit has been designed for DS1/E1 (VT1.5 and VT2) demapping from sonet/SDH frame, it can be used in any such demapping application including in OTN circuits. This description will mainly focus on STS-1/STM-0 to VT1.5/VT2 demapping and its subsequent interface to DS1/E1 line interface circuits which drive DS1/E1 signal on physical cable.

This design uses all standard digital components so it is portable to any standard cell ASIC library or FPGA without requiring any analog or custom design.

The overall solution requires less area and consumes less power compared to a digital and analog combined solution.

Although this design is currently targeted at VT1-5→T1 and VT2→E1 data rates, it can be easily modified to satisfy other clocking rates, making it very useful in a variety of telecom products.

Figures 1, 2:
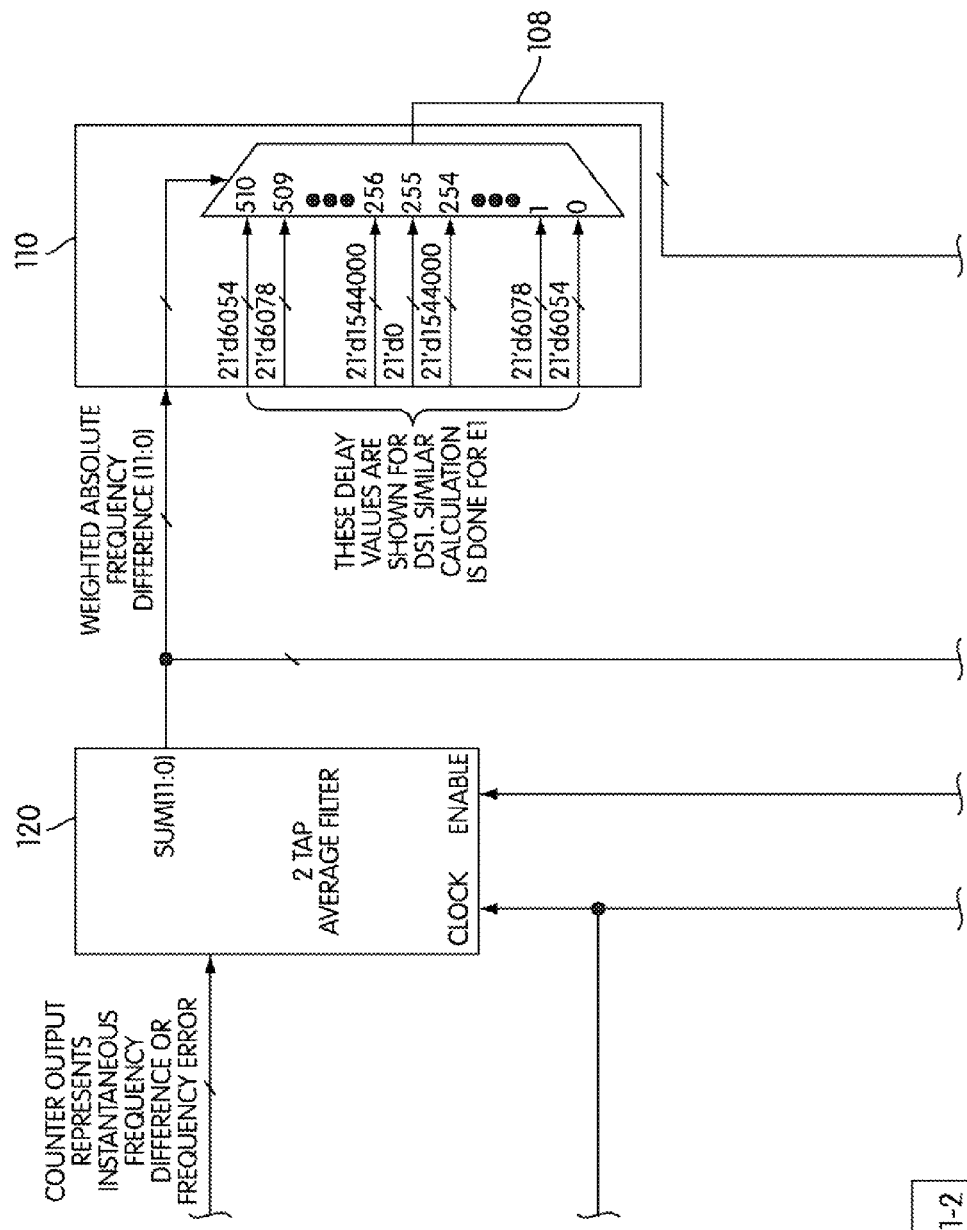
FIG. 2 is a timing diagram that shows an input demapped gapped clock verses a desired degapped smooth clock output with 50% duty cycle and edge jitter less than 1/32 of times of one clock period of DS1 or E1 clock.

FIG. 2 shows the input clock and desired output clock from dejitter (de-synchronizer) circuit. Both incoming demapped jittery clock and internally generated reference clock (generated from local oscillator) ideally have the same frequency (either DS1: 1.544 MHz or E1: 2.048 MHz depending on configuration), but they have a different PPM frequency offset. Moreover, the incoming clock is a jittery, non-50% duty cycle, gapped as shown in FIG. 2.

As shown in FIG. 2 the purpose of dejitter circuit design is that it will take demapped gapped clock with jitter and noise and generate the dejittered smooth clock output with 50% duty cycle and less than $2\pi/32$ of edge jitter.

Figures 1, 2, 3:
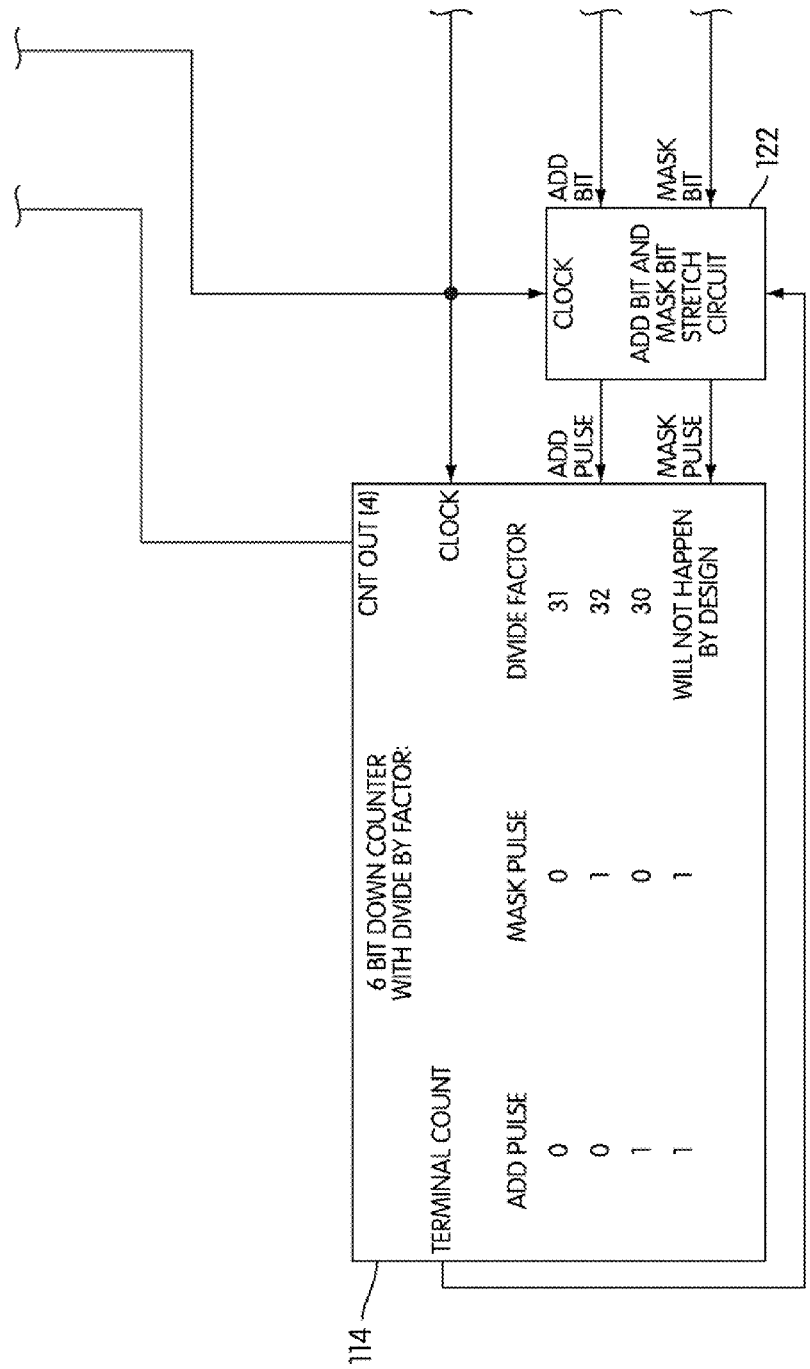
FIG. 3 shows an overall system block diagram describing application of dejiiter circuit to VT demapper circuit for DS1/E1 application to reduce demapping jitter and smooth the incoming gapped clock.

The overall system block diagram for DS1/E1 demapping application is shown below in FIG. 3.

The entire circuit/logic can work on 32× DS1/E1 clock. (32 times of DS1 or E1 clock. DS1 clock, which is 1.544 MHz+/−32 PPM*32=49.408+/−32 PPM or 32 times of E1 clock, which is 2.048 MHz+/−32 PPM*32=65.536 MHz+/−32 PPM depending on configuration) Since the whole logic works with one reset and one clock, the logic is fully synchronous. Hereafter in this documentation, it will be termed as a core clock. Its divided by 32 version is termed as reference clock which has frequency equal to base rate DS1 clock (1.544 MHz) or base rate E1 clock (2.048 MHz) with +/−32 PPM offset depending on configuration.

However, the actual demapped gapped clock input is equal to DS1 base rate clock (1.544 MHz) with different PPM (+/−32 PPM) offset or E1 base rate clock (2.048 MHz) with different PPM (+/−32 PPM) offset along with frequency offset created by pointer movement and noise introduced in the system which finally comes to +/−255 Hz of total frequency offset compared to reference clock. When the circuit is configured for DS1, all DS1 related clocks will be used and core clock will be 32 times DS1 base rate clock which is equal to 49.408 MHz. It can be sourced from an external crystal oscillator. When the circuit is configured for E1, all E1 related clocks will be used and core clock will be come 32 times E1 base rate clock which is equal to 65.536 MHz. It can also be sourced from external crystal oscillator. Again, reference clock (which is derived from core clock) will have same frequency and different PPM offset compared to that of incoming demapped gapped clock although between +/−32 PPM range.

Figures 1, 2, 3, 4:
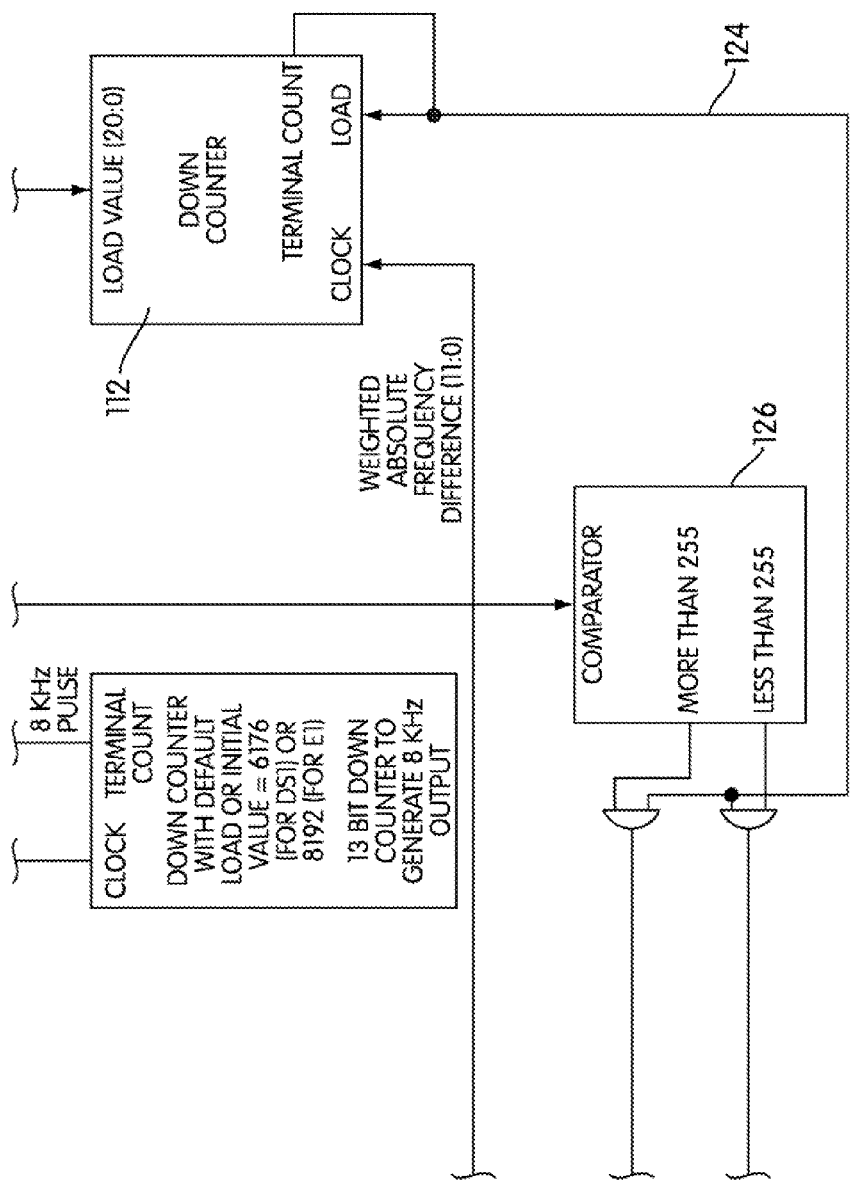
FIG. 4 shows an overall system block diagram describing application of dejitter circuit to any demapper circuit in any other telecom application such as OTN etc. to reduce demapping jitter and smooth clock.
Figure 2:
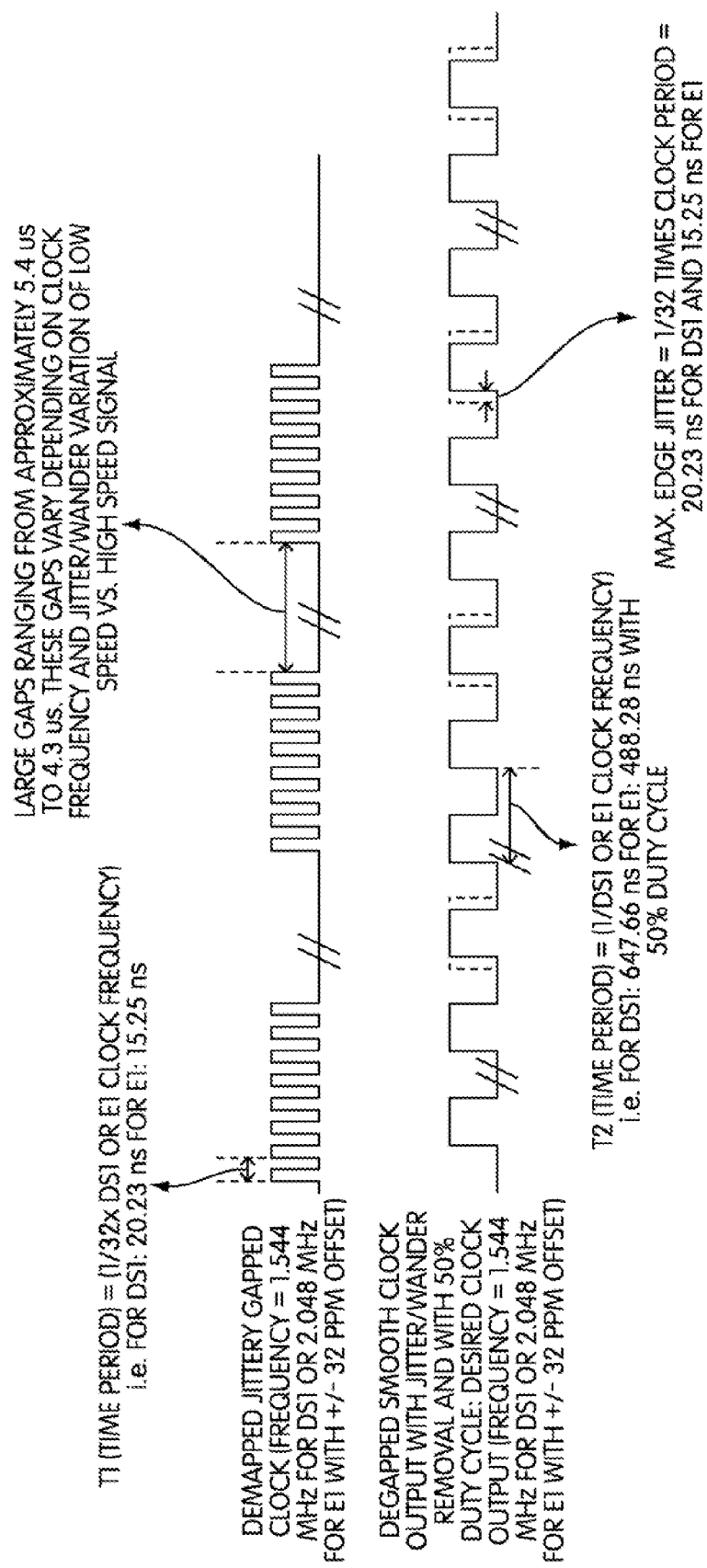
Figure 3:
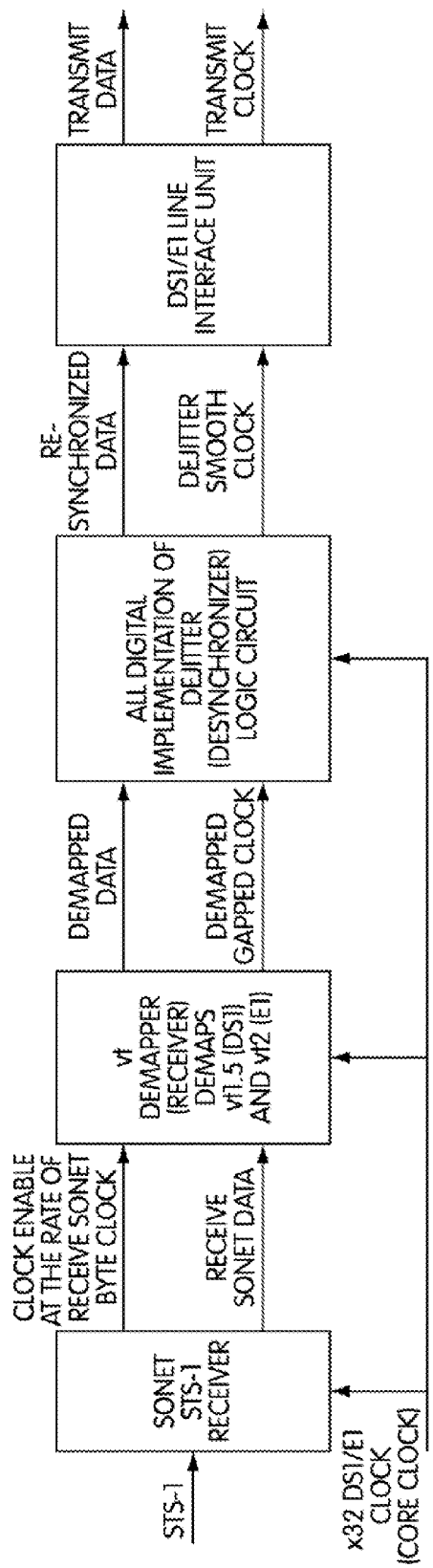
Figure 4:
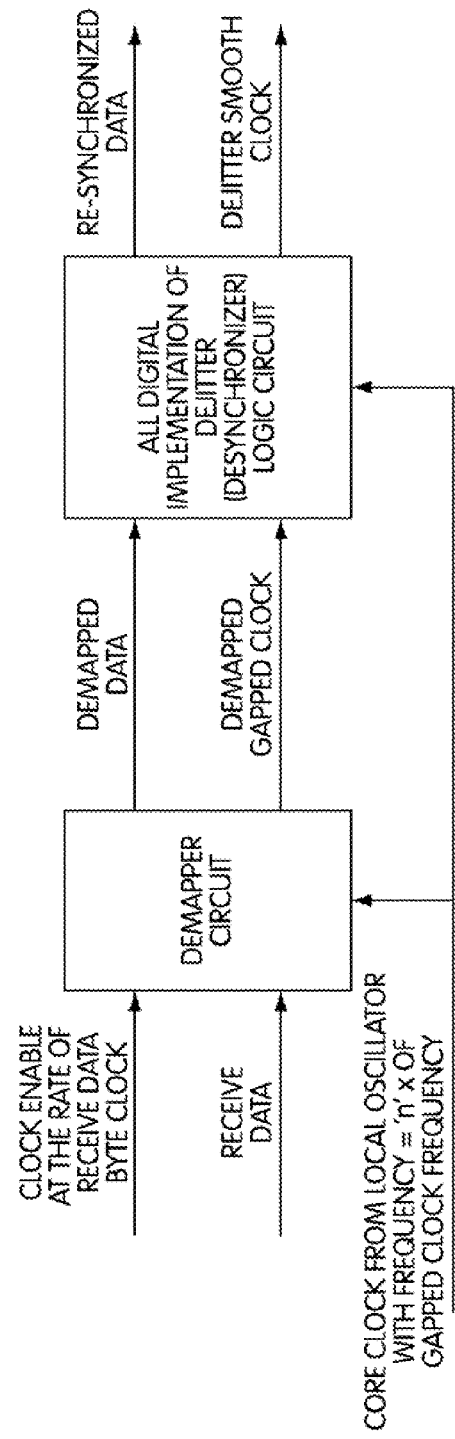

This design can easily be modified to satisfy several other similar applications. We need external oscillator clock which provides core clock which is "n" times (integral number of times) of desired dejittered clock and within PPM limit of given specification. Local oscillator clock is termed as core clock (n times of reference clock) and it's divided by 'n' version is termed as reference clock. Reference clock does not have to match the PPM of incoming demapped clock but should lie within the bounds permitted by related specification. 'n' is chosen in such a way that maximum 1/n UI jitter will be introduced on outgoing clock edge. For example, the design of FIG. 1 sets n=32. As stated before, both reference clock and incoming demapped clock have same frequency but different PPM frequency offset. The overall system block diagram for usage of this dejitter circuit in any other demapping application is shown in FIG. 4.

Figure 5:
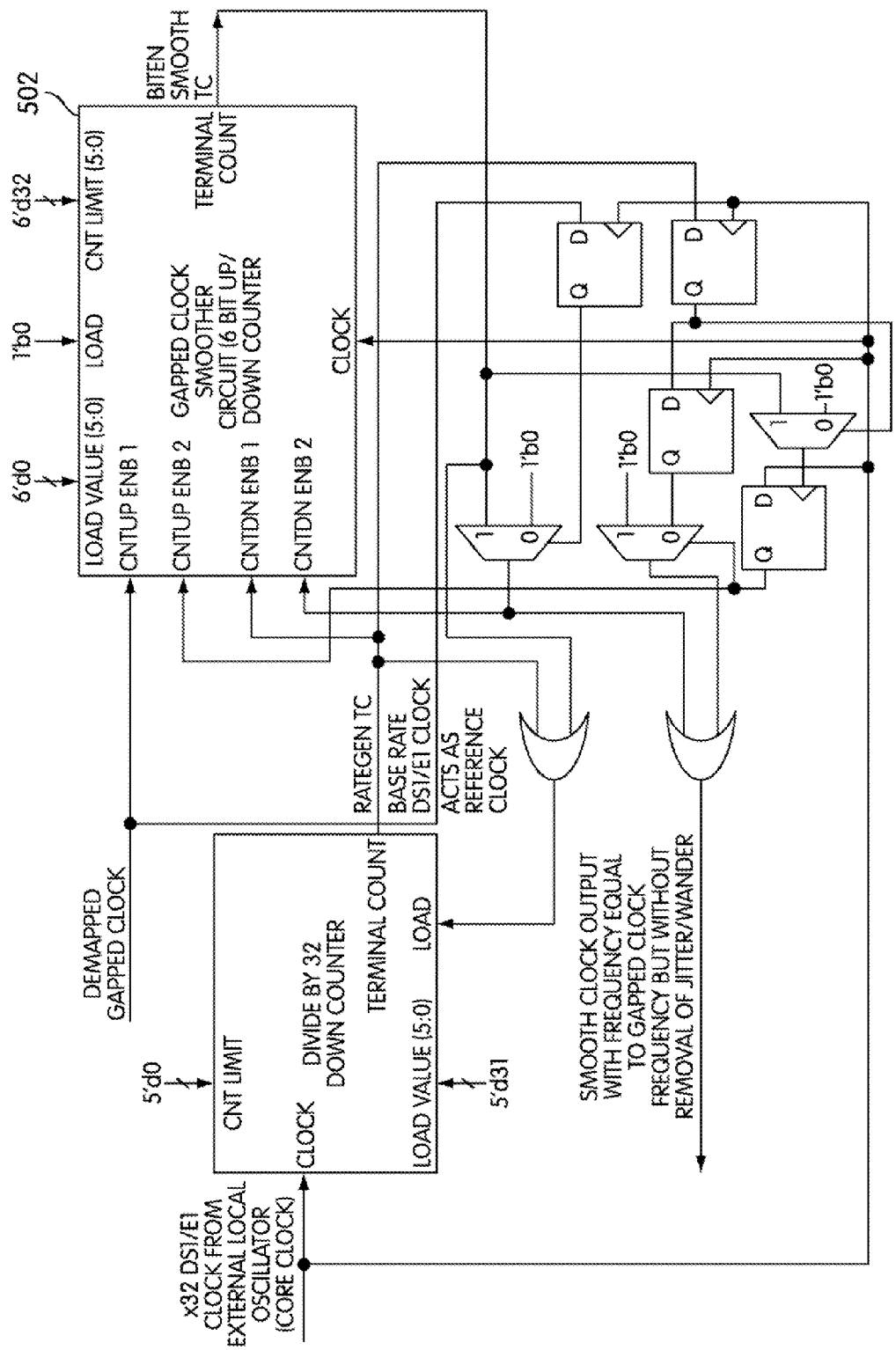
FIG. 5 is a timing diagram that shows a gapped clock smoother circuit without jitter/wander attenuation.
Figure 6:
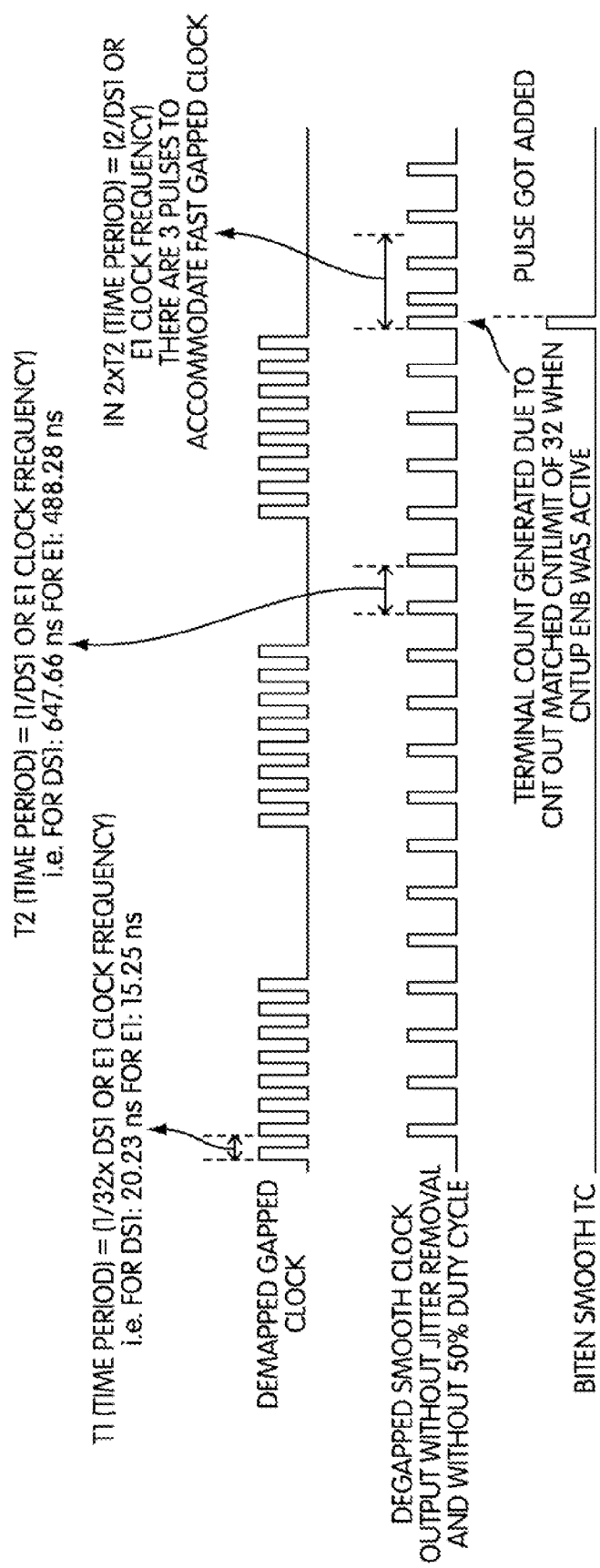
FIG. 6 shows a demapped gapped clock that is faster than reference clock derived from ×32 DS1/E1 clock.
Figure 7:
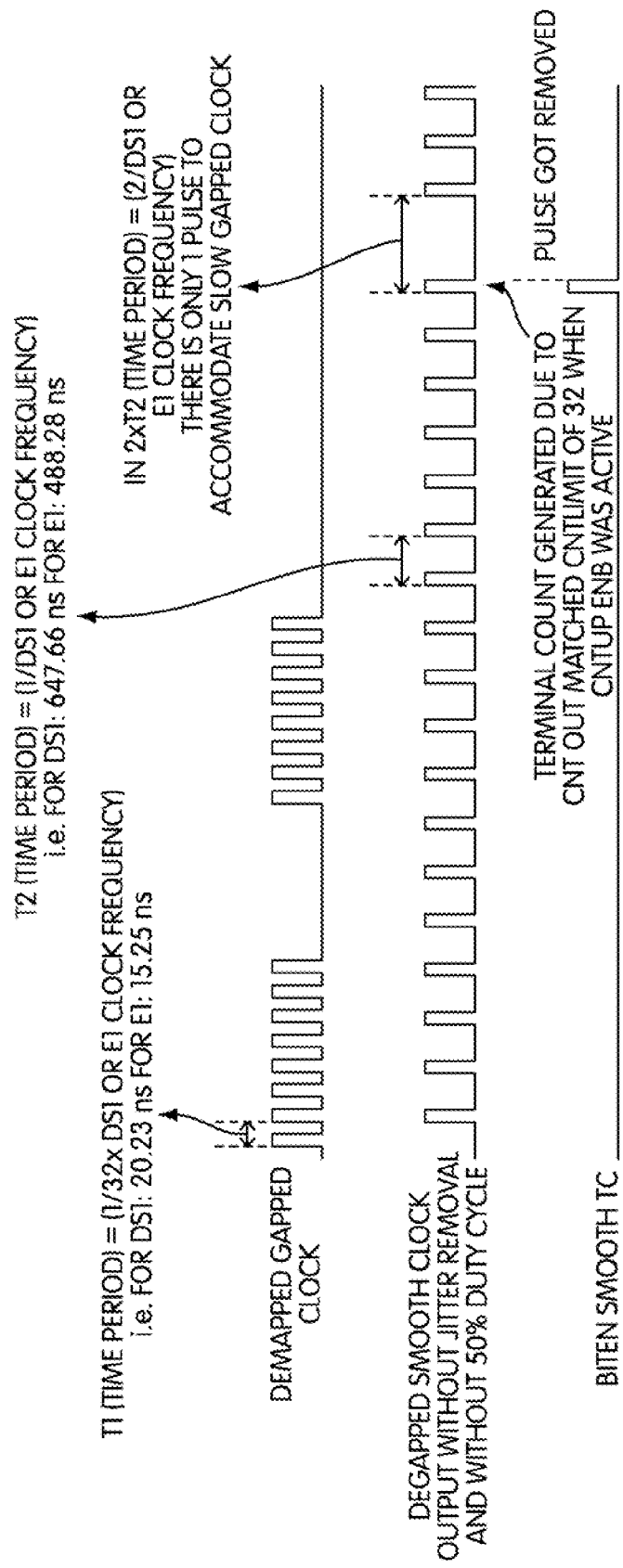
FIG. 7 is a timing diagram that shows a demapped gapped clock that is slower than reference clock derived from ×32 DS1/E1 clock.

Gapped Clock Smoother Circuit:

In this example, the "Gapped clock smoother circuit" 118 operates on core clock (49.408 MHz for DS1 which is 32 times of DS1 base rate clock of 1.544 MHz or at 65.536 MHz for E1 which is 32 times of 2.048 MHz derived from local oscillator). The input clock to this circuit is the demapped gapped clock as shown in FIG. 6 and FIG. 7 below. The output of this part of circuit is "bitten_smooth_tc" on line 105. It is clock which has same frequency as that of incoming demapped gapped clock but does not have large gaps as that of the input clock. The gapped clock smooth circuit 118 removes the large gaps, but still occasionally has one reference clock (DS1 clock rate, 1.544 MHz or E1 clock rate, 2.048 MHz) pulse added or removed within 2 clock periods of reference clock. A logical block diagram of an exemplary "Gapped clock smoother circuit" is shown in FIG. 5.

Advantage of this Logic/Circuit:

The output of this logic/circuit which is relatively non-gapped and jittery clock but still has exact same frequency as that of gapped clock is given to frequency comparator. Frequency comparator compares the frequencies of this relatively smoothed gapped clock and produced clock which is derived as final dejitter smooth clock output. The local oscillator clock which is 32× DS1 or E1 clock is used as core clock. It has generally different PPM compared incoming demapped gapped clock and has low jitter. Up/down counter is used to find out the frequency difference between these clocks. If there are large gaps in gapped clock, we may not know exact difference between it and reference clock reliably until waiting for frequency difference to accumulate at the output of frequency comparator up/down counter for as large as 1 second period. This will lead to large size (no. of bits) of up/down counter for frequency comparator and ultimately constraining filter design down the path. The "gapped smoother circuit" 118 simplifies design of further blocks such as frequency comparator and digital filter.

Operation of Logic/Circuit:

Looking at FIG. 5, Reference clock (for DS1: 1.544 MHz, for E1: 2.048 MHz) is generated by dividing core clock of 32× DS1/E1 from local oscillator by 32. The local oscillator provides relatively low jitter clock output. This reference clock has in general different PPM offset compared to that of incoming gapped clock. So, the idea is that this "Gapped clock smoother circuit" will use this reference clock and add one pulse within 2 clock period of time when the frequency difference between gapped clock and reference clock becomes +32 meaning gapped clock is faster than reference clock and difference reaches 32. Otherwise if the gapped clock is slower than reference clock, this logic circuit will remove one pulse in 2 clock period of reference clock, from reference clock after the frequency difference between gapped clock and reference clock reaches to −32. +/−32 numbers is chosen because the amount of gap in gapped clock is less than +/−32 clock periods of reference clock. When the pulse is added in output clock, the up/down counter 502 is decremented by 1 and when the pulse is removed from output clock the up/down counter is incremented by 1 to reflect the applied changes in the counter. When both cntup_enb_1 and cntup_enb_2 are high, the counter is incremented by 2. Otherwise if any one of the cntup_enb is high, the counter is incremented by 1. This is done to accommodate possible simultaneous changes of increment due to gapped clock and increment due to removal of pulse in output clock. Similarly, when both cntdn_enb_1 and cntdn_enb_2 are high, the counter is decremented by 2. Otherwise if any one of the cntdn_enb is high, the counter is decremented by 1. This is done to accommodate possible simultaneous changes of decrement due to reference clock and decrement due to addition of pulse in output clock. With this mechanism the up/down counter output never goes beyond +/−32. The default value of the counter is "0" which is loaded after reset. It is never loaded again until the circuit is reset again. The terminal count is generated whenever the count reaches to 32 either due to up counting or due to down counting. The up/down counter is not reset after terminal count. Instead the above mechanism is used to saturate its value at or below 32.

Remember both reference clock and incoming demapped gapped clock are base rate clocks (for DS1: 1.544 MHz, or for E1: 2.048 MHz) but they have a different frequency offset. This circuit generates the clock which still has frequency of gapped clock but has very distributed and small gaps. As mentioned already, it makes the frequency comparator logic circuit and filter circuit design relatively easy by limiting gate count and other complexity in control logic.

FIG. 6 shows an example where one pulse is added to increase frequency of reference clock to match to gapped clock. It is done in such a way that these added pulses are separated over a time and only one pulse is added at a time making the output clock much smoother avoiding large gaps but still having same clock frequency as that of gapped clock input.

FIG. 7 shows an example where one pulse is removed to decrease the frequency of reference clock to match to gapped clock. It is done in such a way that these removed pulses are separated over a time and only one pulse is removed at a time making the output clock much smoother avoiding large gaps but still having same clock frequency as that of gapped clock input.

Figures 1, 8:
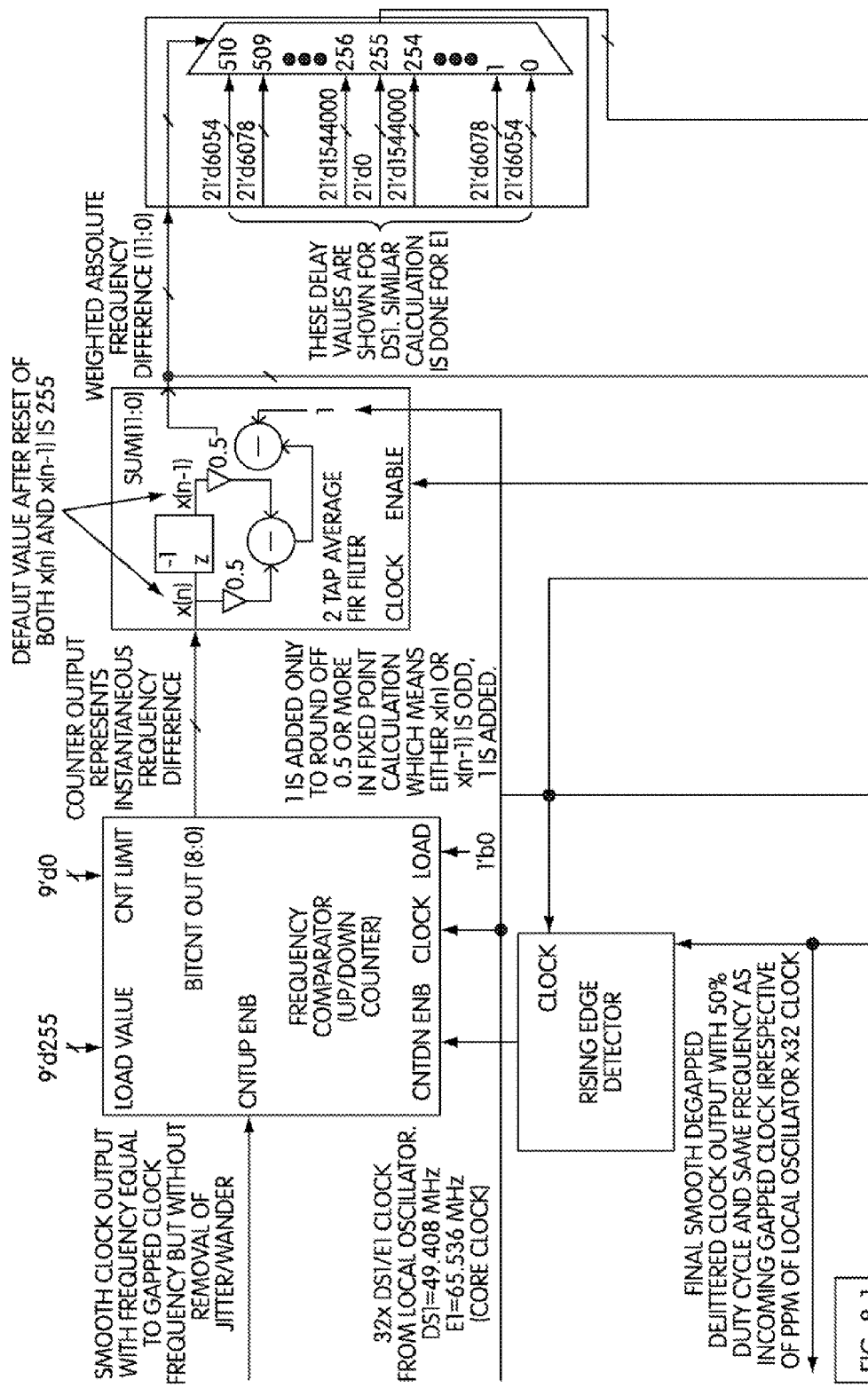
FIG. 8 shows frequency comparator, 2 tap digital average/sum filter and frequency correction mechanism.
Figures 2, 8:
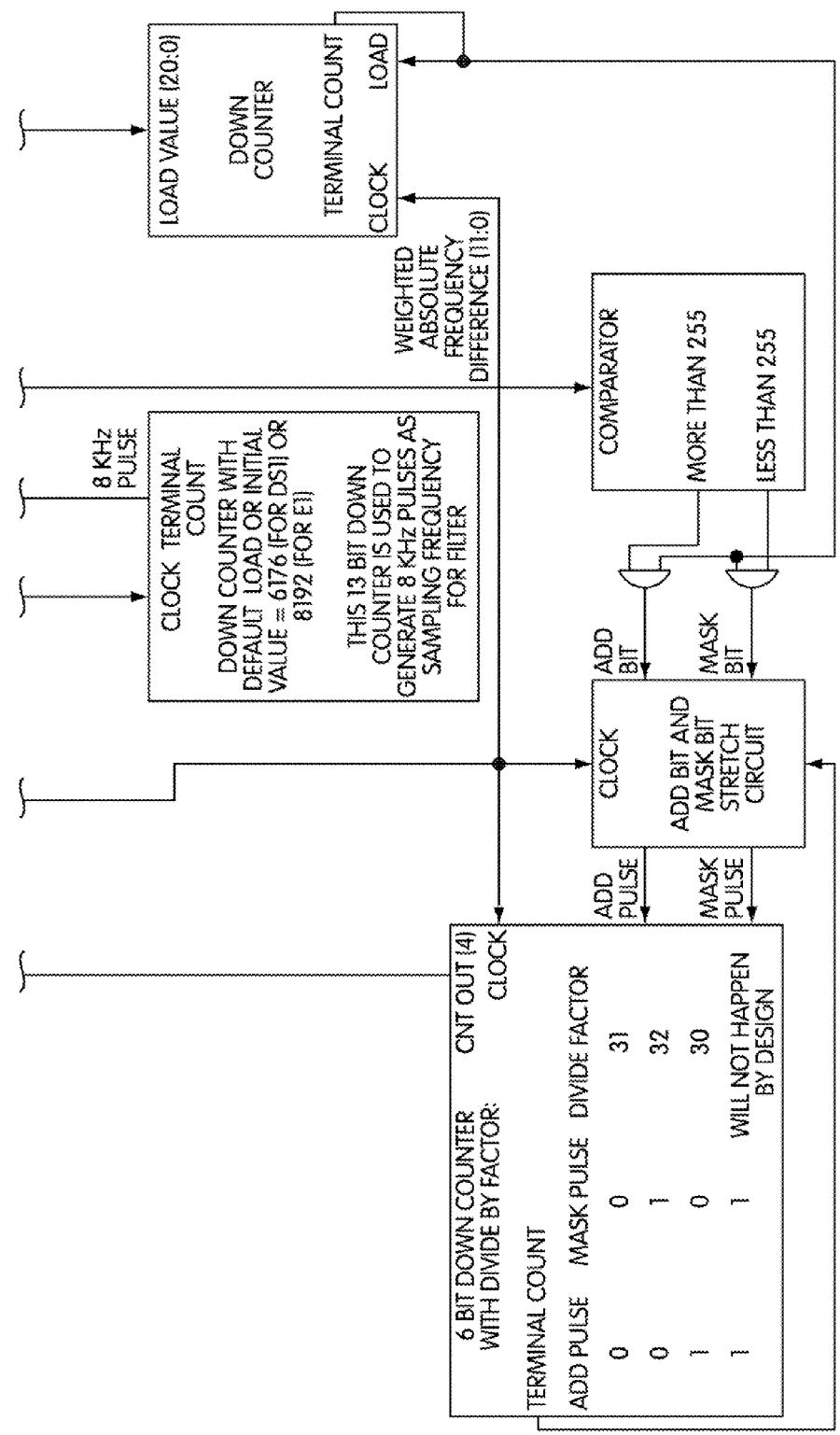

Frequency Comparator:

As shown in FIGS. 1 and 8, frequency comparator is implemented using 9 bit up/down counter. We do not need larger size counter because incoming gapped clock is already smoothed out by previous "Gapped clock smoother circuit" by removing larger gaps. So, the same smoothed demapped jittery clock which has fewer gaps but still has same frequency of gapped clock is compared against the reference clock generated from local oscillator. Smoothed demapped clock is given to cntup_enb while pulses generated from rising edge detector of dejitter smooth clock output are given to cntdn_enb. So, ultimately cntup_enb is toggled at the same rate of incoming demapped gapped clock while cntdn_enb is toggled at the same rate of dejitter smooth clock output resulting in to frequency comparator. The value at the count output of this up/down counter represents frequency difference between incoming gapped clock and final dejitter smooth clock at any given instant. This up/down counter is set with value of 255 by default after reset. Since it is 9 bit counter, when cntup_enb is high it increments by 1 from default value of 255 while when cntdn_enb is high it decrements by 1 from the default value of 255. This counter is not loaded again during its operation unless gets reset again. It thus saturates if it reaches to 511 and another increment pulse comes. Similarly, it will saturate to 0 if it reaches to 0 and another decrement pulse comes. So, it is designed to follow the frequency difference between −255 Hz to +255 Hz. The requirement of +/−255 Hz comes from above explanation of jitter/wander spec item 7 in this document.

Digital Filter:

The output of frequency comparator is also considered as frequency error and is given to 2 tap average FIR filter to filter out +/−255 Hz and give it to following second order loop filter circuit to provide the exact frequency correction to reference clock such that it will modify to represent the incoming clock frequency which ultimately creates final dejitter smooth clock with 50% duty cycle.

Figure 9:
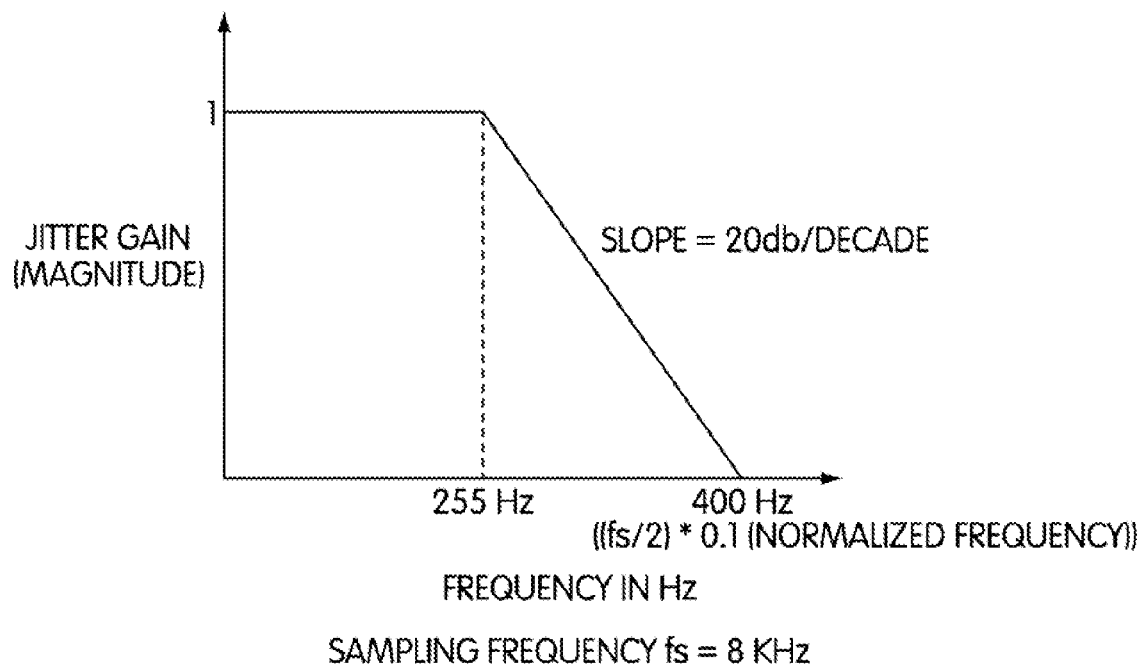
FIG. 9 is a graph of the frequency response of the 2 tap digital average/sum filter of FIG. 8.

The frequency response of the 2 tap average FIR filter is shown in FIG. 9.

This filter frequency response helps to moderate the sudden frequency changes in incoming gapped clock to limit within 255 Hz range. For example: x(n) could be 248 while x(n-1) is 255. These sudden changes are smoothed out and provided to second order loop to correct the final output clock. The number 255 Hz comes from the fact that incoming DS1/E1 gapped clock has +/−32 PPM frequency offset from reference clock; there is VT pointer movement at about 100 ms and stuffing/destuffing events within demapping process. In addition there is noise and wander added by the system on to incoming clock is also considered. It is explained below in the jitter/wander spec. Both x(n) and x(n-1) are loaded with 255 default value after reset. The 2 tap average filter works at core clock with 8 KHz clock as enable. So, ultimately 8 KHz is sampling frequency which is chosen to get above the frequency response. The calculations have done in fixed point arithmetic where 0.5 is rounded off to 1. So, if either x(n) or x(n-1) samples are odd number, then 1 is added at final filter output. So, if x(n)=256 and x(n-1)=255 then 0.5*x(n)=128 and 0.5*x(n-1)=127. So, x(n)+x(n-1)=128+127=255 and 1 is added in to it making the filter output 256.

This filter also adds in to stability of the feedback loop. The analysis of system stability is as follows:

$$H(z) = \sum_{K=0}^{K=L-1} z^{-K} = \frac{1-z^{-L}}{1-z^{-1}}$$

Here, L=2, substituting this value of L, we get:

$$H(z) = \frac{1-z^{-2}}{1-z^{-1}} = \frac{z^2-1}{z(z-1)}$$

Figure 10:
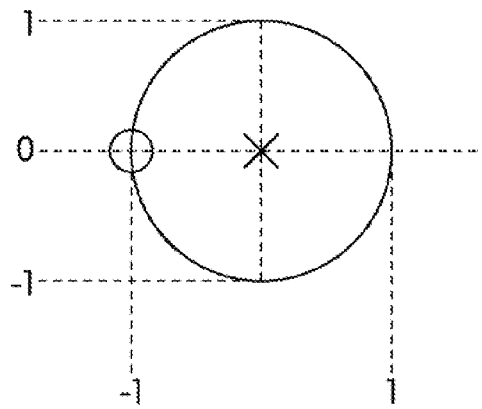
FIG. 10 is a pole diagram of the 2 tap digital average/sum filter of FIG. 8.

The pole-zero diagram is shown in FIG. 10. It shows that the zero at z=1 is cancelled by the corresponding term in denominator adding only −90 degrees or less of phase shift at gain crossover. So, system is stable.

Frequency Correction:

Next in the path is doing frequency correction based on the filter output. There is another cascaded low pass filter which is added such that it can provide the exact time instance where correction to reference clock should be applied creating final dejitter smooth clock with MTIE less than 700 ns (for DS1). We are deriving produced clock which is final dejitter smooth clock from reference clock by applying +/−(2π/32) phase correction after "td" delay to reference clock.

The second order loop generates the time constant based on the output of previous filter. It corrects 1/32 of one DS1 or E1 base rate clock (reference clock) at one time. But, each of these corrections is separated from each other by "td" amount of delay which is time constant of this cascaded filter. So, let's say value of count "n" for counter that is operating on 32× DS1/E1 clock (core clock from local oscillator) and generating this required "td" delay to compensate 1 Hz is as follows:

n=(1544000*32)/32 for DS1 td=n*time period of core clock which is same as, td=n*(1/(1544000*32)) for DS1

To add +1 Hz, after every "td" delay, the phase correction is applied to reference clock by decreasing its total (2π) phase per cycle by (2π/32) phase for 32 times within 1 second. This constitutes adding +1 cycle in reference clock creating a produced clock which we call as "final dejitter smooth output clock" which has same frequency as that of incoming gapped clock but edge jitter limited to (2π/32) phase of local reference clock. Similarly, to change the reference clock by −1 Hz considering the incoming gapped clock is less than reference clock by 1 Hz, we add (2π/32) phase after every "td" delay for 32 times, which removes 1 cycle in 1 second, which ultimately generates "final dejitter smooth clock" with −1 Hz frequency than reference clock and with edge jitter of (2π/32) phase on reference clock. Fractional frequency difference between incoming gapped clock and reference clock is corrected over the period "m" seconds if the frequency difference happened to be 1/m Hz. For example frequency difference of ½ Hz (0.5 Hz) will be corrected in 2 seconds.

So, "td" delay (delta time) between the consecutive corrections is given as follows:

$$\Delta \text{ time between corrections} = \frac{1}{32 \times \text{frequency difference}}$$

The count "n" to achieve this "td" delay or delta time between consecutive corrections is given as follows:

$$n = \frac{1544000}{\text{frequency difference}} \text{ for } DS1 \text{ and } n = \frac{2048000}{\text{frequency difference}}$$

Figure 11:
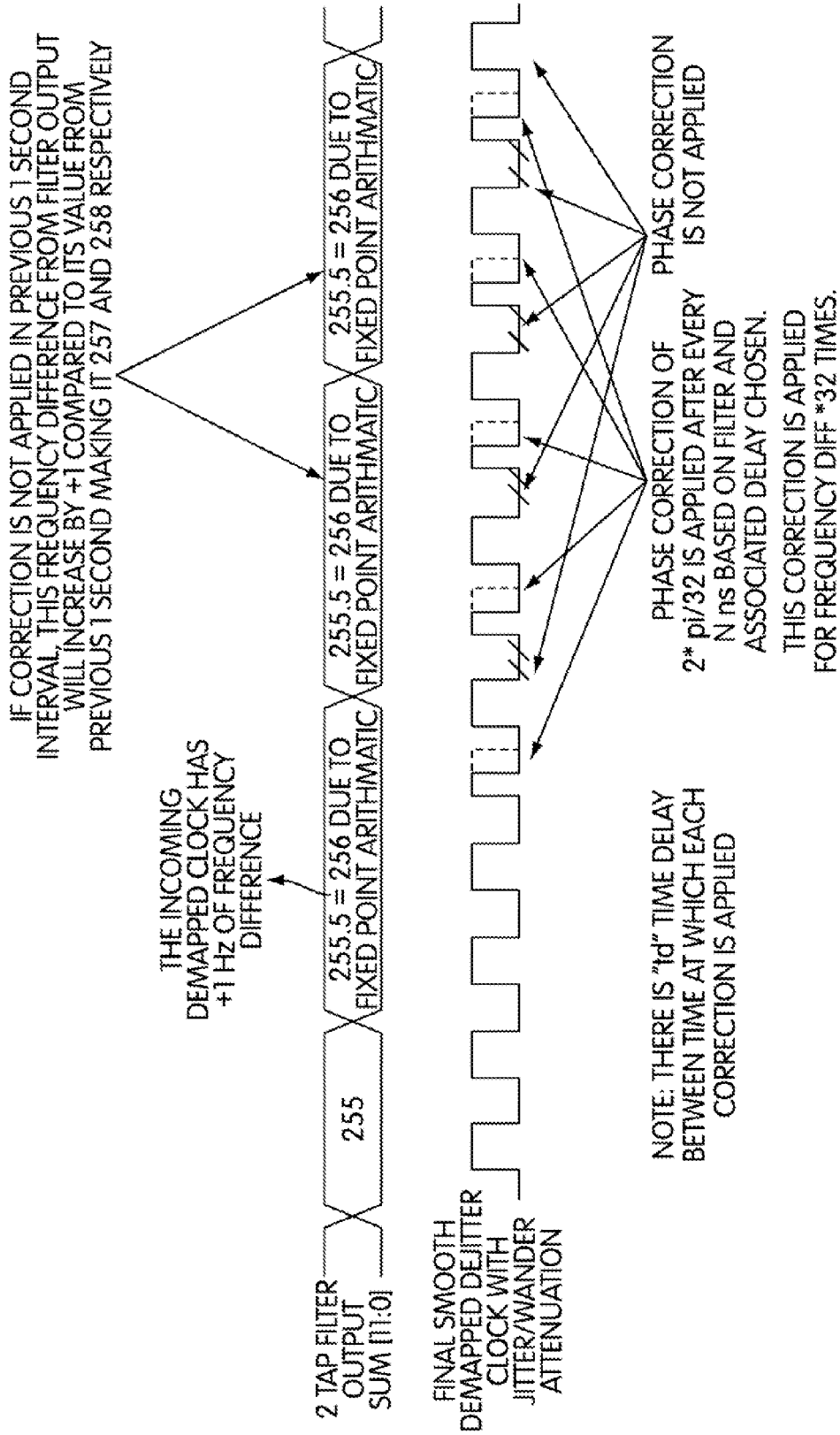
FIG. 11 shows a correction applied to reference clock which is derived from ×32 DS1/E1 clock based on filter output to generate the final dejittered degapped smooth clock output with 50% duty cycle.

The actual frequency correction is shown in following timing diagram shown in FIG. 11.

Figure 12:
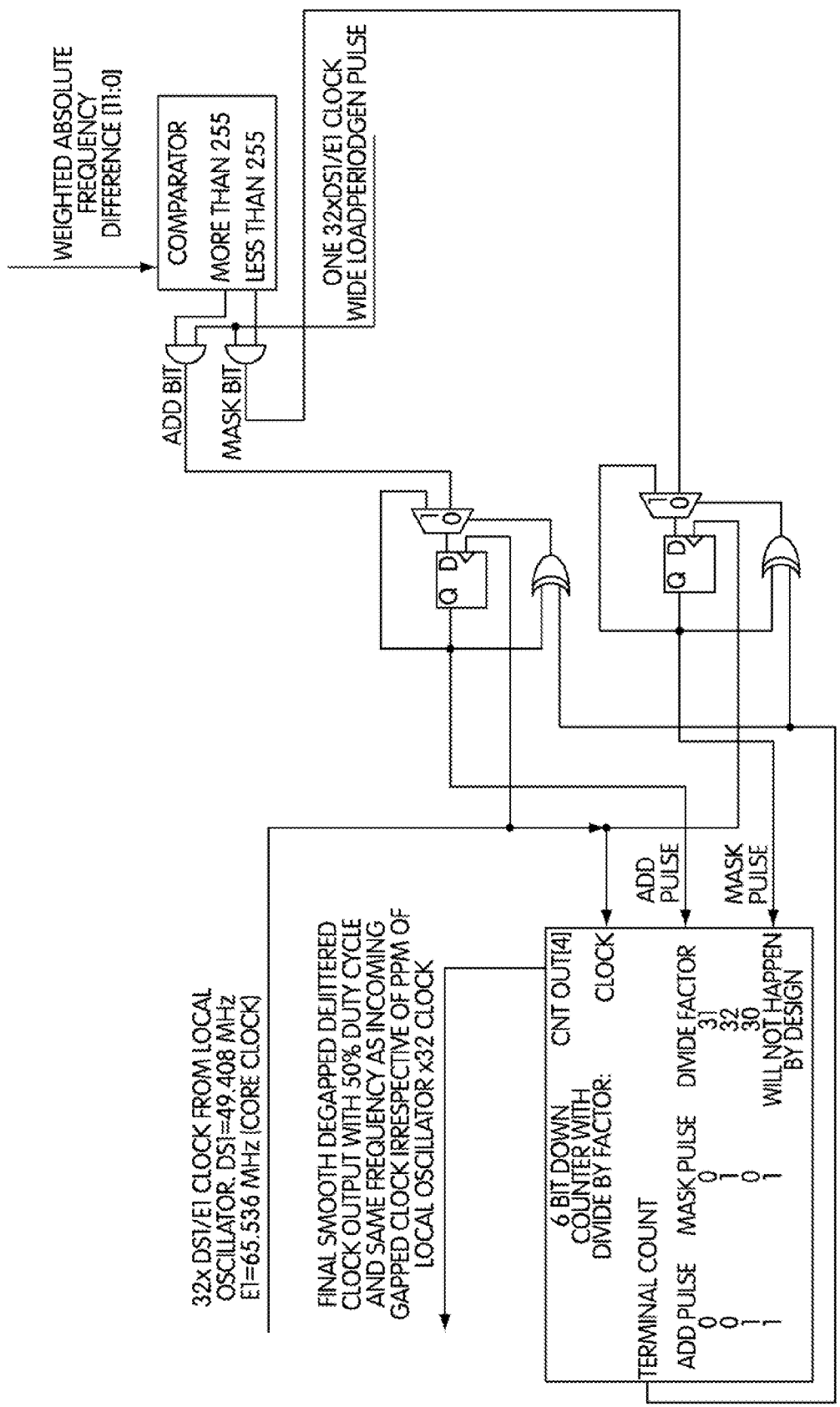
FIG. 12 shows add_bit, mask_bit stretching logic circuit.

To achieve this output there are few blocks that we need to understand after both the digital filters. Please refer to FIG. 8. To actually generate one clock wide pulses of core clock after "td" delay, 21 bit down counter is used with load value from second filter. This value gets loaded after every "terminal count" event. The initial load value is going to be "0" since initial filter output is 255 by default after reset. Afterwards the frequency difference gets accumulated. The average filter delays the time when frequency error is presented to second filter by its own frequency response curve to stabilize the system. The second filter chooses the appropriate "n" count of 21 bit down counter in the path as described above to generate appropriate "td" delay. Once this count is loaded in to down counter, it ignores all the other frequency errors presented by first filter all the way up to terminal count of this down counter. At the terminal count it generates a pulse which is ANDed with comparator output which decides if correction is positive (to decrease the 2π/32 phase) or negative (to increase the 2π/32 phase) creating add_bit or mask_bit pulses. This pulse is one clock wide pulse of 32× DS1/E1 clock which is core clock. The following circuit shown in FIG. 12 is used to stretch the pulse until the terminal count of next 6 bit down counter, which creates final dejitter smooth clock. (2π/32) phase is decreased from reference clock after "td" delay if add_bit pulse is high and (2π/32) phase is increased from reference clock after "td" delay if mask_bit pulse is high. add_bit and mask_bit stretch logic is shown in FIG. 12.

It is important to stretch this add_bit and mask_bit pulse until it is recorded by 6 bit down counter which modifies the reference clock (divide by 32 of 32× DS1/E1 clock which is core clock) to generate the final dejitter smooth clock with 50% duty cycle. The mechanism is shown in above FIG. 12. If the add_bit or mask_bit pulse, as well as terminal count are high at the same edge of core clock, the add_bit or mask_bit takes priority and loads 30 or 32 instead of 31 and then clears the add_bit or mask_bit pulse. We use the $4^{th}$ bit of 6 bit counter for final dejitter clock output where bit 5 is MSB to generate 50% duty cycle of the dejitter smooth clock.

Thus, final dejitter smooth clock is generated from reference clock by modifying it at regular and spread intervals of "td" in smooth way (derived from filter gain) and reflecting the same exact frequency that incoming demapped gapped clock has. This final dejitter clock is again fed back to frequency comparator as shown in FIG. 1 closing the feed back loop.

Figure 13:
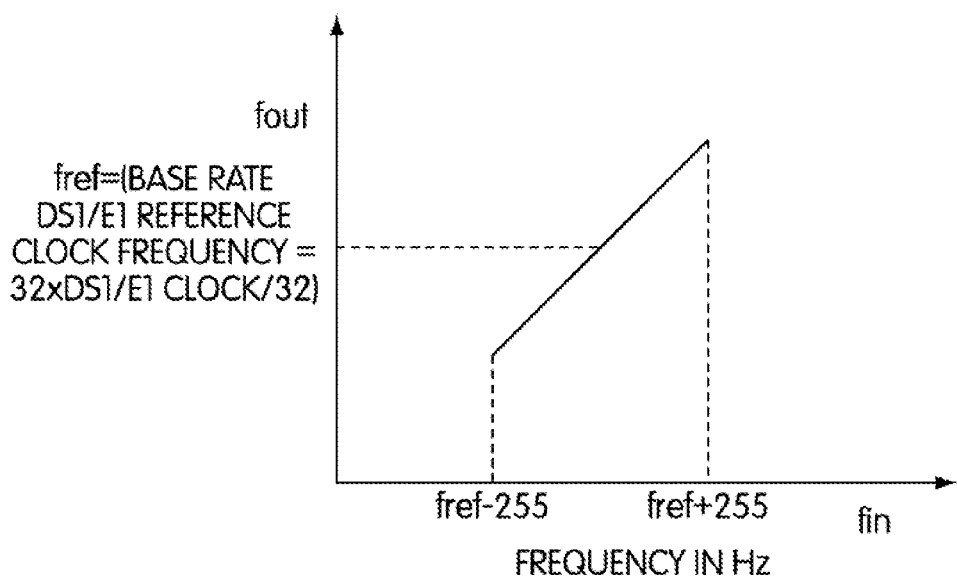
FIG. 13 is a graph that shows the relationship between output clock frequencies vs. input clock frequency.

So, finally the relationships between output dejitter smooth clock frequency fout versus input demapped gapped clock frequency is as shown in FIG. 13.

As described above digital filters have been designed to stabilize the control loop and filter out jitter/wander, frequency offset between incoming clock and reference clock. This slows down the time applied to reference clock to generate final dejitter clock output requiring FIFO to accommodate flow of data bits coming from incoming gapped clock domain to outgoing dejitter smooth clock domain. Since, +/−255 Hz of maximum correction applied, the total data FIFO size chosen is 256*2=512 bits. It is shown in FIG. 1 above in document.

The above described logic/circuit can generate dejitter smooth clock representing same exact frequency as that of incoming demapped gapped clock. The dejitter smooth clock output has 50% duty cycle and edge jitter limited to ⅟32 UI of the reference clock. It satisfies MTIE requirement of 700 ns for both jitter and wander frequencies. The detailed evaluation report of the circuit tested against standard test equipment is attached to this document.

Figure 14:
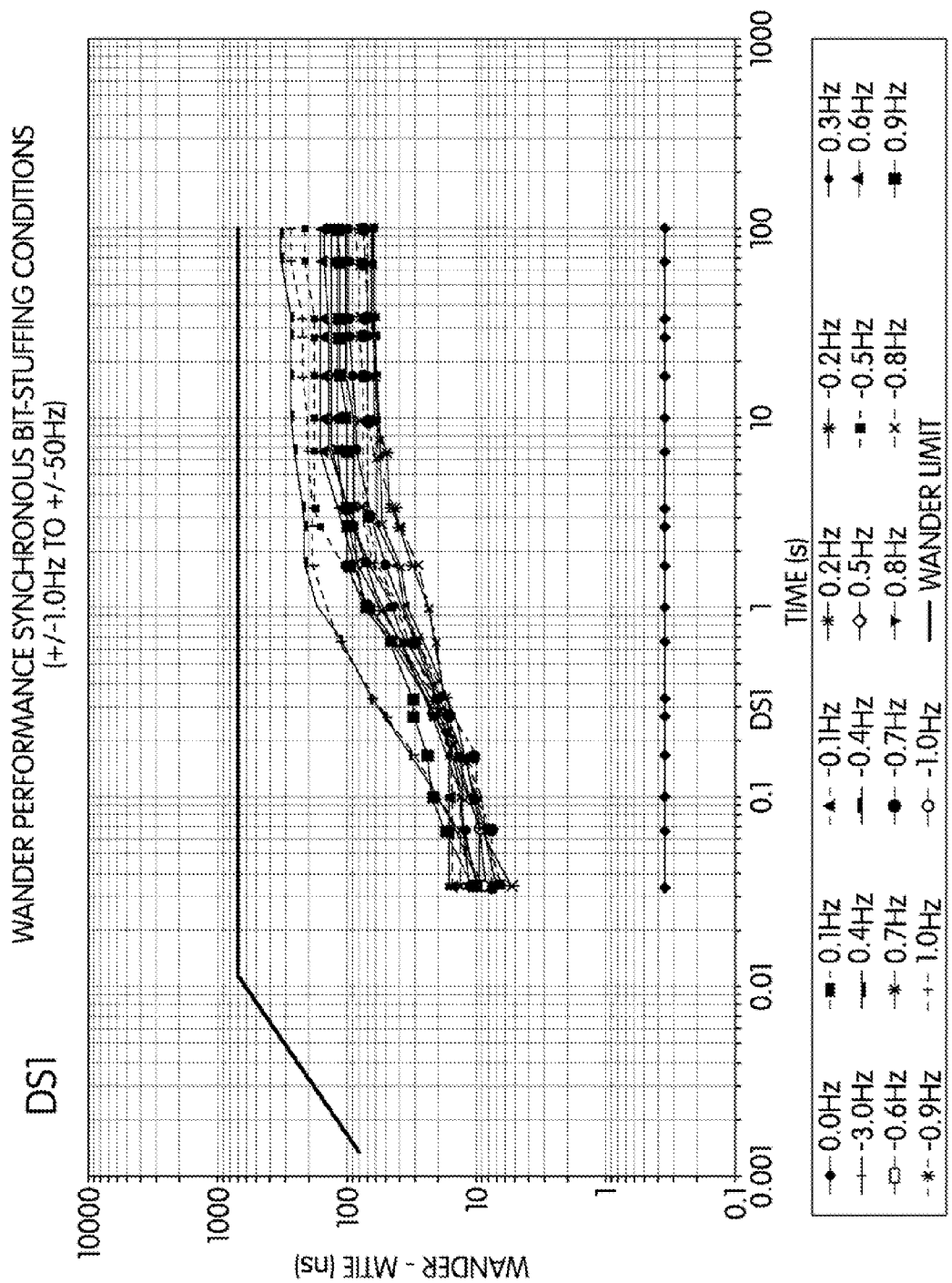
FIG. 14 is a graph that shows experimental results of a DS1 version of a prototype of the system of one embodiment.
Figure 15:
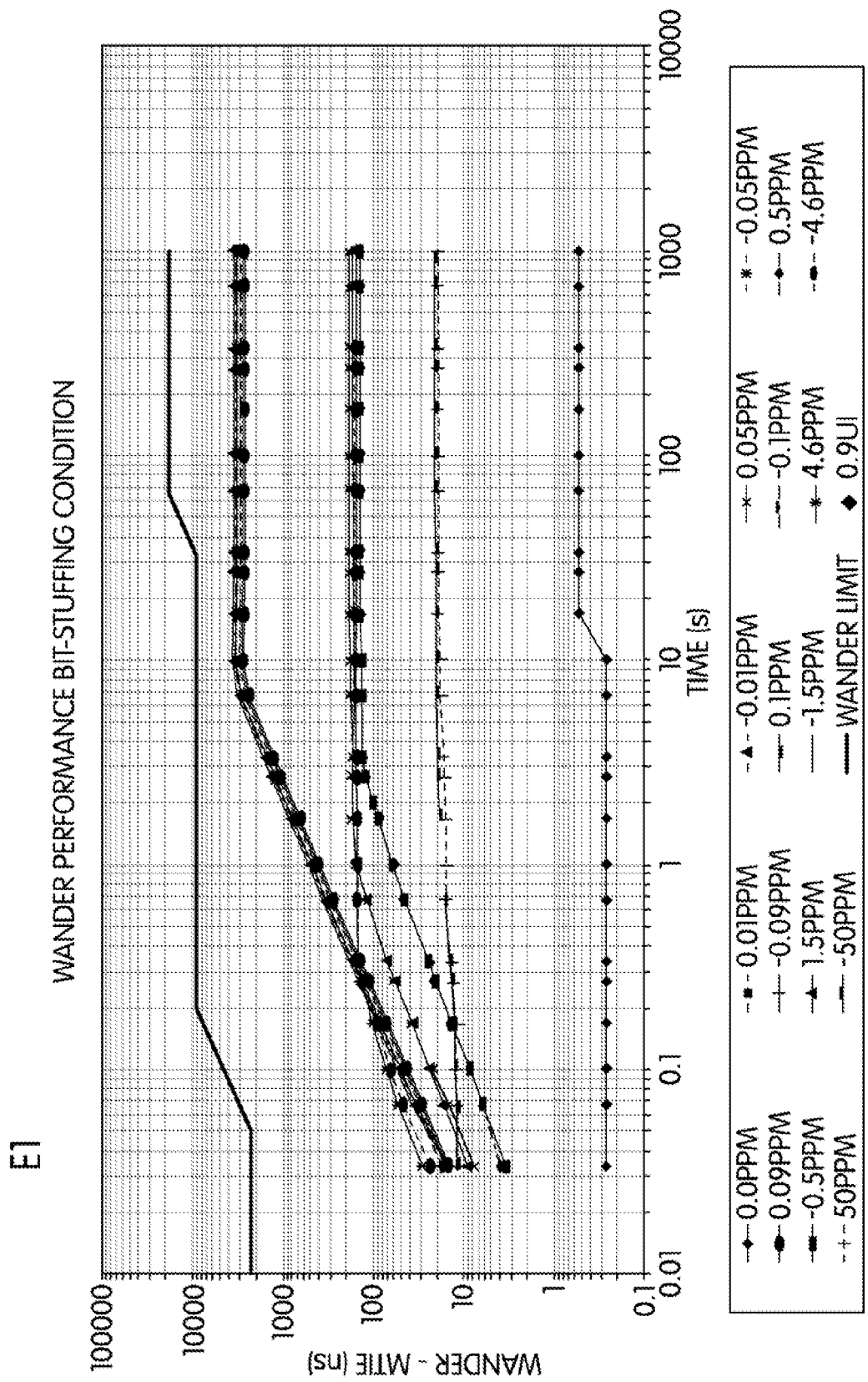
FIG. 15 is a graph that shows experimental results of an E1 version of a prototype of a system of one embodiment.

Experimental test results for the DS1 version of the system are shown in FIG. 14. Experimental test results for the E1 version of this system are shown in FIG. 15.

Jitter/Wander Specification for VT1.5/VT2 demapping (DS1/E1) according to telecom standards:

1. According to R5-238 (GR-253-CORE) spec., phase smoothing circuits shall be employed when an asynchronous DSn payload is demultiplexed from an STS or VT SPE and then multiplexed in to higher bit rate DSn or another STS or VT SPE within a single SONET NE.
2. It also states that category I mapping jitter should not exceed 0.7 UIpp. The stuffing mechanism that generates the C-bits shall be implemented such that the output jitter is less than 0.7 UIpp assuming no jitter or wander at the input of the synchronizer and no pointer adjustments.
3. According to ITU-T G.783 (15.2.3.3.1) the wander on a 1544 knits/s payload signal out of an SDH island due to asynchronous mapping process and wander generation of the clocks shall be less than 700 ns (MTIE: Maximum Time Interval Error)
4. According to R5-249 mapping spacing between consecutive pointer adjustments in to input signal shall be equal to or greater than 0.5 times the long term average spacing when there are no pointer adjustments on incoming signal and there is constant frequency offset between incoming and outgoing signal.
5. According to R5-250 mapping spacing between consecutive pointer adjustments in to input signal shall be equal to or greater than 0.5 times the long term average spacing when there are pointer adjustments on incoming signal and there is no frequency offset between incoming and outgoing signal.
6. Long term spacing of pointers=104 bytes in VT 1.5 super frame*4 frames of spacing between 2 consecutive frames*500 us per VT super frame=208 ms. 0.5 of this time spacing is 104 ms. So, fastest pointer adjustments allowed per RS-249 (due to frequency offset of incoming and outgoing signal)=after every 104 ms which is about 10 times per second. Similarly, fastest pointer adjustments allowed per RS-250 (due to incoming pointer adjustments)=after every 104 ms which is about 10 times per second. Putting both RS-249 and RS-250 together the fastest and worst condition for pointer adjustments on incoming and outgoing signal together=20 times per second. So, +/−160 bits per second. According to standard you ca have=/−32 PPM frequency offset on DS1/E1 signal itself that would cause bit stuffing. 32 PPM can cause 1.544*32=49.408 (50 bits per second) and 2.048*32 (65.536 bits per second) change. So, in worst possible scenario of PPM offset and pointer adjustments we might have to support for 66+160=226 bits more or less per second from incoming DS1/E1 signal.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A logic system, comprising:
a smoother circuit, configured to receive a core clock having a substantially constant period and a gapped clock, and to generate a degapped clock, wherein the gapped clock has a plurality of repeated pulse times, during which the gapped clock has a plurality of pulses substantially having a period near but not equal to the period of the core clock, wherein the gapped clock additionally has a plurality of repeated stable times, during which the gapped clock has no pulses, and wherein the repeated pulse times and the repeated stable times alternate, the smoother circuit comprising:
digital circuitry configured to generate an add/remove signal based at least in part on the gapped clock and on the degapped clock, and
a pulse generator circuit configured to generate the degapped clock based on the gapped clock, the core clock, and the add/remove signal,
wherein the degapped clock has a plurality of repeated pulse times, during which the degapped clock has a plurality of pulses occurring at a frequency near but not equal to the average frequency of the gapped clock, and wherein the degapped clock has a plurality of adjustment times, during which the degapped clock either has no pulses or has two pulses,
wherein the pulse generator circuit is configured to generate either no pulses or two pulses during each of the adjustment times based on the add/remove signal of the digital circuitry; and
a dejitter circuit, configured to receive the degapped clock and to generate an output clock, the dejitter circuit comprising:
digital circuitry configured to generate an extend/shorten signal based at least in part on the degapped clock and on the output clock, and
a clock generator circuit configured to generate the output clock based at least in part on the core clock and on the extend/shorten signal,
wherein the output clock has frequency substantially equal to the average frequency of the gapped clock, and has a jitter of less than about the period of the core clock.

2. The logic system of claim 1, wherein the smoother circuit and the dejitter circuit are all digital.

3. The logic system of claim 1, wherein the smoother circuit and the dejitter circuit comprise synchronous digital logic.

4. The logic system of claim 1, wherein the add/remove signal represents a difference between a frequency of the gapped clock and the degapped clock.

5. The logic system of claim 1, wherein the digital circuitry of the smoother circuit comprises an up/down counter configured to generate the add/remove signal.

6. The logic system of claim 1, wherein the pulse generator circuit of the smoother circuit comprises digital logic configured to receive the gapped clock, the core clock, the add/remove signal, and a divided core clock, and, during the repeated pulse times of the gapped clock, to selectively generate pulses spaced apart by substantially the period of the divided core clock and having a duration substantially equal to the duration of pulses of the core clock.

7. The logic system of claim 6, wherein the smoother circuit further comprises a divide by counter configured to receive the core clock and generate the divided core clock.

8. The logic system of claim 1, wherein the pulse generator circuit of the smoother circuit comprises digital logic configured to receive the gapped clock, the core clock, the add/remove signal, and a divided core clock, and, during the adjustment times of the gapped clock, to selectively generate either no pulses or two pulses having a duration substantially equal to the duration of pulses of the core clock.

9. The logic system of claim 8, wherein the smoother circuit further comprises a divide by counter configured to receive the core clock and generate the divided core clock.

10. The logic system of claim 1, wherein the output clock is substantially 50% duty cycle.

11. The logic system of claim 1, wherein the digital circuitry of the dejitter circuit comprises an up/down counter configured to generate the extend/shorten signal.

12. The logic system of claim 1, wherein the clock generator circuit of the dejitter circuit comprises a counter having a programmable divide by factor.

13. The logic system of claim 12, wherein the output clock is the core clock divided by the programmable divide by factor, and wherein the programmable divide by factor is determined based on the extend/shorten signal.

14. The logic system of claim 13, wherein the extend/shorten signal represents a difference between a frequency of the degapped clock and the output clock, wherein the programmable divide by factor causes the clock generator circuit to cause the output clock to have a lower frequency in response to the extend/shorten signal indicating that the frequency of the degapped clock is less than the frequency of the output clock, and wherein the programmable divide by factor causes the clock generator circuit to cause the output clock to have a higher frequency in response to the extend/shorten signal indicating that the frequency of the degapped circuit is greater than the frequency of the output circuit.

15. The logic system of claim 1, wherein the clock generator circuit of the dejitter circuit is configured to generate the output clock such that the output clock has a plurality of clock cycles, wherein each clock cycle has a selectable duration equal to one of:
a. a predetermined duration,
b. the predetermined duration plus the period of the core clock, and
c. the predetermined duration minus the period of the core clock, and wherein the selectable duration is determined based on the extend/shorten signal.

16. The logic system of claim 15, wherein every other clock cycle has a duration equal to the predetermined duration.

17. The logic system of claim 1, wherein the dejitter circuit further comprises a filter, and wherein the extend/shorten signal is a filtered version of a frequency indication signal representing a difference between a frequency of the degapped clock and the output clock.

18. The logic system of claim 17, wherein the filter is a $1^{st}$ order digital filter.

19. The logic system of claim 1, wherein the gapped clock signal is provided from demapper logic.

20. The logic system of claim 1, wherein the output clock meets one of the telecom specifications DS1 or E1.

* * * * *